(12) United States Patent
Szewczyk et al.

(10) Patent No.: US 9,775,410 B2
(45) Date of Patent: Oct. 3, 2017

(54) WEB ADJUSTERS FOR USE WITH RESTRAINT SYSTEMS AND ASSOCIATED METHODS OF USE AND MANUFACTURE

(71) Applicant: SHIELD Restraint Systems, Inc., Elkhart, IN (US)

(72) Inventors: Alexander J. Szewczyk, Elkhart, IN (US); Brandon Marriott, Goshen, IN (US); David D. Merrick, Rochester, IN (US); Wayne D. Carter, Constantine, MI (US)

(73) Assignee: Shield Restraint Systems, Inc., Elkhart, IN (US)

( * ) Notice: Subject to any disclaimer, the term of this patent is extended or adjusted under 35 U.S.C. 154(b) by 52 days.

(21) Appl. No.: 14/971,819

(22) Filed: Dec. 16, 2015

(65) Prior Publication Data
US 2016/0166013 A1    Jun. 16, 2016

Related U.S. Application Data

(60) Provisional application No. 62/092,769, filed on Dec. 16, 2014.

(51) Int. Cl.
*A44B 11/12*    (2006.01)
*B60R 22/34*    (2006.01)
*B60R 22/30*    (2006.01)

(52) U.S. Cl.
CPC ............ *A44B 11/125* (2013.01); *B60R 22/30* (2013.01); *Y10T 24/4016* (2015.01); *Y10T 24/4077* (2015.01)

(58) Field of Classification Search
CPC ............. Y10T 24/4016; Y10T 24/4072; Y10T 24/4077; A44B 1/125
See application file for complete search history.

(56) References Cited

U.S. PATENT DOCUMENTS 906,045 A    12/1908  Martin
1,079,080 A  11/1913  Ward
(Continued)

FOREIGN PATENT DOCUMENTS

CA    2036493 A1    8/1991
CA    2038505 A1    9/1991
(Continued)

OTHER PUBLICATIONS

Britax, "COMPAQ: Convertible Car Seats," Buckle Image, accessed Oct. 12, 2010, www.britax.com.au/car-seats/compaq, 2 pages. This has been publicly available for at least one year prior to this application's filed.

(Continued)

*Primary Examiner* — Robert J Sandy
(74) *Attorney, Agent, or Firm* — Perkins Coie LLP

(57) ABSTRACT

Various embodiments of web adjusters are disclosed herein. In one embodiment, a web adjuster includes a spring-loaded cam member having a bore through which a mounting shaft or pin extends for rotatably or pivotally mounting the cam member to a frame. The cam member can extend along a central axis and include a first engagement feature positioned at a first radial distance from the central axis, and a second engagement feature positioned at a second radial distance from the central axis, larger than the first radial distance. The cam member can be rotated to engage the web to restrict movement of the web. The web adjuster can also include a handle or cover portion and a strap attached to the handle for gripping by a user to adjust the web adjuster.

20 Claims, 13 Drawing Sheets

(56) References Cited

U.S. PATENT DOCUMENTS

| | | |
|---|---|---|
| 1,369,456 A | 2/1921 | Meredith |
| 1,438,898 A | 12/1922 | Carpmill |
| 1,816,262 A | 7/1931 | Ritter |
| 1,930,378 A | 10/1933 | Beagan |
| 2,132,556 A | 10/1938 | Blackshaw |
| 2,255,258 A | 9/1941 | Lethern et al. |
| 2,372,557 A | 3/1945 | Dowd |
| 2,393,178 A | 1/1946 | Manson |
| 2,437,585 A | 3/1948 | Zimmern |
| 2,482,693 A | 9/1949 | Rogers et al. |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,668,997 A | 2/1954 | Irvin et al. |
| 2,710,999 A | 6/1955 | Davis |
| 2,763,451 A | 9/1956 | Moran |
| 2,803,864 A | 8/1957 | Bishaf |
| 2,845,233 A | 7/1958 | Pfankuch et al. |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,921,353 A | 1/1960 | Cushman |
| 2,938,254 A | 5/1960 | Gaylord |
| D188,897 S | 9/1960 | Prete, Jr. |
| 2,964,815 A | 12/1960 | Sereno |
| 2,965,942 A | 12/1960 | Carter |
| 3,029,487 A | 4/1962 | Shinichiro |
| 3,034,596 A | 5/1962 | Twaits, Jr. |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,132,399 A | 5/1964 | Cooper |
| 3,137,907 A | 6/1964 | Unai |
| D198,566 S | 7/1964 | Holmberg |
| 3,142,103 A | 7/1964 | Lindblad |
| 3,142,968 A | 8/1964 | Basham et al. |
| 3,145,442 A | 8/1964 | Brown |
| 3,165,805 A | 1/1965 | Lower |
| 3,178,226 A | 4/1965 | Cates |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board et al. |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,323,829 A | 6/1967 | Liem |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein et al. |
| 3,451,720 A | 6/1969 | Makinen |
| 3,473,201 A | 10/1969 | Hopka et al. |
| 3,491,414 A | 1/1970 | Stoffel |
| 3,505,711 A | 4/1970 | Carter |
| 3,523,342 A | 8/1970 | Spires |
| D218,589 S | 9/1970 | Lohr |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,747,167 A | 7/1973 | Pravaz |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garvey |
| 3,879,810 A | 4/1975 | Prete, Jr. et al. |
| 3,898,715 A | 8/1975 | Balder |
| 3,935,618 A | 2/1976 | Fohl |
| 3,964,138 A | 6/1976 | Gaylord |
| 3,975,800 A | 8/1976 | Farlind |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | Dipaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike |
| 4,273,301 A | 6/1981 | Frankila |
| 4,302,049 A | 11/1981 | Simpson |
| 4,317,263 A | 3/1982 | Fohl |
| 4,321,734 A | 3/1982 | Gandelman |
| 4,323,204 A | 4/1982 | Takada |
| 4,334,341 A | 6/1982 | Krautz et al. |
| 4,336,636 A | 6/1982 | Ishiguro et al. |
| 4,344,588 A | 8/1982 | Hollowell et al. |
| 4,366,604 A | 1/1983 | Anthony et al. |
| 4,385,425 A | 5/1983 | Tanaka et al. |
| 4,403,376 A | 9/1983 | Palloks |
| 4,408,374 A | 10/1983 | Fohl |
| 4,419,874 A | 12/1983 | Brentini |
| 4,425,688 A | 1/1984 | Anthony et al. |
| 4,428,103 A | 1/1984 | Wier et al. |
| 4,454,634 A | 6/1984 | Haglund et al. |
| D274,861 S | 7/1984 | Lindblad |
| 4,457,052 A | 7/1984 | Hauber |
| 4,487,454 A | 12/1984 | Biller |
| 4,491,343 A | 1/1985 | Fohl |
| 4,525,901 A | 7/1985 | Krauss |
| 4,545,097 A | 10/1985 | Wier |
| 4,549,769 A | 10/1985 | Pilarski |
| 4,555,831 A | 12/1985 | Otzen et al. |
| 4,562,625 A | 1/1986 | Hunter et al. |
| 4,569,535 A | 2/1986 | Haglund et al. |
| 4,574,911 A | 3/1986 | North et al. |
| D285,383 S | 9/1986 | Anthony |
| 4,617,705 A | 10/1986 | Anthony et al. |
| 4,637,102 A | 1/1987 | Teder et al. |
| 4,638,533 A | 1/1987 | Gloomis et al. |
| 4,640,550 A | 2/1987 | Hakansson |
| 4,644,618 A | 2/1987 | Holmberg et al. |
| 4,646,400 A | 3/1987 | Tanaka |

(56) References Cited

U.S. PATENT DOCUMENTS

| | | |
|---|---|---|
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst |
| 4,685,176 A | 8/1987 | Burnside |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen |
| 4,832,410 A | 5/1989 | Bougher |
| 4,843,688 A | 7/1989 | Ikeda |
| 4,854,607 A | 8/1989 | Mandracchia et al. |
| 4,854,608 A | 8/1989 | Barral |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno |
| 4,942,649 A | 7/1990 | Anthony et al. |
| 4,995,640 A | 2/1991 | Saito |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | Van Riesen |
| 5,097,572 A | 3/1992 | Warrick |
| 5,100,176 A | 3/1992 | Ball et al. |
| D327,455 S | 6/1992 | Blair |
| 5,119,532 A | 6/1992 | Tanaka |
| 5,123,147 A | 6/1992 | Blair |
| 5,123,673 A | 6/1992 | Tame |
| 5,142,748 A | 9/1992 | Anthony et al. |
| 5,159,732 A | 11/1992 | Burke |
| 5,160,186 A | 11/1992 | Lee |
| 5,165,149 A | 11/1992 | Nihei |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,306,044 A | 4/1994 | Tucker |
| 5,308,148 A | 5/1994 | Peterson et al. |
| 5,311,653 A | 5/1994 | Merrick |
| 5,332,968 A | 7/1994 | Brown |
| 5,350,195 A | 9/1994 | Brown |
| 5,350,196 A | 9/1994 | Atkins |
| 5,364,048 A | 11/1994 | Fujimura et al. |
| 5,369,855 A | 12/1994 | Tokugawa |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | McFalls |
| 5,406,681 A | 4/1995 | Olson |
| 5,411,292 A | 5/1995 | Collins et al. |
| 5,416,957 A | 5/1995 | Renzi, Sr. et al. |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| D362,415 S | 9/1995 | Takimoto |
| 5,451,094 A | 9/1995 | Templin et al. |
| D364,124 S | 11/1995 | Lortz et al. |
| 5,471,714 A | 12/1995 | Olson |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,540,403 A | 7/1996 | Standley |
| 5,560,565 A | 10/1996 | Merrick et al. |
| 5,561,891 A | 10/1996 | Hsieh |
| 5,566,431 A | 10/1996 | Haglund |
| 5,568,676 A | 10/1996 | Freeman |
| 5,570,933 A | 11/1996 | Rouhana et al. |
| 5,577,683 A | 11/1996 | Imai |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,640,468 A | 6/1997 | Hsu |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |
| 5,779,319 A | 7/1998 | Merrick |
| D397,063 S | 8/1998 | Woellert et al. |
| 5,788,281 A | 8/1998 | Yanagi et al. |
| 5,788,282 A | 8/1998 | Lewis |
| 5,794,878 A | 8/1998 | Carpenter et al. |
| 5,806,148 A | 9/1998 | Mcfalls et al. |
| 5,813,097 A | 9/1998 | Woellert et al. |
| 5,839,793 A | 11/1998 | Merrick et al. |
| 5,857,247 A | 1/1999 | Warrick et al. |

(56) References Cited

U.S. PATENT DOCUMENTS

| | | |
|---|---|---|
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,908,223 A | 6/1999 | Miller |
| 5,915,630 A | 6/1999 | Step |
| 5,934,760 A | 8/1999 | Schroth |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth |
| 6,065,777 A | 5/2000 | Merrick |
| 6,123,388 A | 9/2000 | Vits et al. |
| 6,182,783 B1 | 2/2001 | Bayley |
| RE37,123 E | 4/2001 | Templin et al. |
| 6,224,154 B1 | 5/2001 | Stoki |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,322,149 B1 | 11/2001 | Conforti et al. |
| 6,325,412 B1 | 12/2001 | Pan |
| 6,328,379 B1 | 12/2001 | Merrick et al. |
| 6,343,841 B1 | 2/2002 | Gregg et al. |
| 6,351,717 B2 | 2/2002 | Lambrecht |
| 6,357,790 B1 | 3/2002 | Swann et al. |
| 6,358,591 B1 | 3/2002 | Smith |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B2 | 7/2002 | Haas |
| 6,425,632 B1 | 7/2002 | Anthony et al. |
| 6,442,807 B1 | 9/2002 | Adkisson |
| 6,446,272 B1 | 9/2002 | Lee |
| 6,463,638 B1 | 10/2002 | Pontaoe |
| 6,467,849 B1 | 10/2002 | Deptolla |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk |
| 6,566,869 B2 | 5/2003 | Chamings et al. |
| 6,588,077 B2 | 7/2003 | Katsuyama et al. |
| 6,592,149 B2 | 7/2003 | Sessoms |
| 6,606,770 B1 | 8/2003 | Badrenas Buscart |
| 6,619,753 B2 | 9/2003 | Takayama |
| 6,631,926 B2 | 10/2003 | Merrick et al. |
| 6,665,912 B2 | 12/2003 | Turner et al. |
| 6,694,577 B2 | 2/2004 | Di Perrero |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht |
| 6,786,510 B2 | 9/2004 | Roychoudhury et al. |
| 6,786,511 B2 | 9/2004 | Heckmayr |
| 6,793,291 B1 | 9/2004 | Kocher |
| 6,796,007 B1 | 9/2004 | Anscher |
| 6,802,470 B2 | 10/2004 | Smithson et al. |
| 6,820,310 B2 | 11/2004 | Woodard et al. |
| 6,820,902 B2 | 11/2004 | Kim |
| 6,834,822 B2 | 12/2004 | Koning et al. |
| 6,836,754 B2 | 12/2004 | Cooper |
| 6,837,519 B2 | 1/2005 | Moskalik et al. |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,896,291 B1 | 5/2005 | Peterson |
| 6,902,193 B2 | 6/2005 | Kim et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,931,669 B2 | 8/2005 | Ashline |
| 6,935,701 B1 | 8/2005 | Arnold et al. |
| 6,951,350 B2 | 10/2005 | Heidorn et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,474 B2 | 2/2006 | Midorikawa et al. |
| 6,997,479 B2 | 2/2006 | Desmarais et al. |
| 7,010,836 B2 | 3/2006 | Acton et al. |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,065,843 B1 | 6/2006 | Wu |
| 7,073,866 B2 | 7/2006 | Berdahl |
| 7,077,475 B2 | 7/2006 | Boyle |
| 7,080,856 B2 | 7/2006 | Desmarais et al. |
| 7,083,147 B2 | 8/2006 | Movsesian et al. |
| 7,100,991 B2 | 9/2006 | Schroth |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| D535,214 S | 1/2007 | Kolasa |
| 7,159,285 B2 | 1/2007 | Karlsson |
| 7,180,258 B2 | 2/2007 | Specht et al. |
| 7,182,370 B2 | 2/2007 | Arnold |
| 7,210,707 B2 | 5/2007 | Schroth |
| 7,216,827 B2 | 5/2007 | Tanaka et al. |
| 7,219,929 B2 | 5/2007 | Bell et al. |
| 7,232,154 B2 | 6/2007 | Desmarais et al. |
| 7,237,741 B2 | 7/2007 | Specht |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |
| 7,300,013 B2 | 11/2007 | Morgan et al. |
| 7,341,216 B2 | 3/2008 | Heckmayr |
| 7,343,650 B2 * | 3/2008 | Baldwin ............... A44B 11/14 |
| | | 24/503 |
| 7,360,287 B2 | 4/2008 | Cerruti et al. |
| 7,367,590 B2 | 5/2008 | Koning et al. |
| 7,377,464 B2 | 5/2008 | Morgan |
| 7,384,014 B2 | 6/2008 | Ver Hoven et al. |

(56) References Cited

U.S. PATENT DOCUMENTS

| | | |
|---|---|---|
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 | 1/2009 | Cuevas |
| 7,481,399 B2 | 1/2009 | Nöhren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| D592,830 S | 5/2009 | Whiteside |
| 7,533,902 B2 | 5/2009 | Arnold et al. |
| 7,547,043 B2 | 6/2009 | Kokeguchi et al. |
| D603,753 S | 11/2009 | Palmer et al. |
| 7,614,124 B2 | 11/2009 | Keene et al. |
| 7,631,830 B2 | 12/2009 | Boelstler et al. |
| 7,669,794 B2 | 3/2010 | Boelstler et al. |
| 7,673,945 B1 | 3/2010 | Riffel et al. |
| 7,698,791 B2 | 4/2010 | Pezza |
| 7,716,794 B2 | 5/2010 | Wu |
| 7,716,795 B2 | 5/2010 | Versellie et al. |
| 7,722,081 B2 | 5/2010 | Van Druff et al. |
| 7,739,019 B2 | 6/2010 | Robert et al. |
| 7,753,410 B2 | 7/2010 | Coultrup |
| 7,775,557 B2 | 8/2010 | Boström et al. |
| 7,794,024 B1 | 9/2010 | Kranz et al. |
| RE41,790 E | 10/2010 | Stanley |
| 7,861,341 B2 | 1/2011 | Ayette et al. |
| 7,862,124 B2 | 1/2011 | Dingman |
| 7,871,132 B2 | 1/2011 | Rogers |
| D632,611 S | 2/2011 | Buscart |
| D637,518 S | 5/2011 | Chen |
| 7,934,775 B2 | 5/2011 | Walker et al. |
| 7,945,975 B2 | 5/2011 | Thomas et al. |
| 8,011,730 B2 | 9/2011 | Greenwood |
| 8,037,581 B2 | 10/2011 | Gray et al. |
| 8,096,027 B2 | 1/2012 | Jung et al. |
| 8,240,012 B2 | 8/2012 | Walega et al. |
| 8,240,767 B2 | 8/2012 | Greenwood |
| 8,256,073 B2 | 9/2012 | Zhang |
| 8,381,373 B2 | 2/2013 | Jung |
| 8,387,216 B1 | 3/2013 | Martinson |
| 8,468,660 B2 | 6/2013 | Holler |
| 8,567,022 B2 | 10/2013 | Keene et al. |
| 8,627,554 B1 | 1/2014 | Hagan et al. |
| D729,119 S | 5/2015 | Janes |
| 2002/0089163 A1 | 7/2002 | Bedewi et al. |
| 2002/0135175 A1 | 9/2002 | Schroth |
| 2002/0145279 A1 | 10/2002 | Murray |
| 2003/0015863 A1 | 1/2003 | Brown et al. |
| 2003/0027917 A1 | 2/2003 | Namiki et al. |
| 2003/0085608 A1 | 5/2003 | Girardin |
| 2004/0084953 A1 | 5/2004 | Hansen |
| 2004/0169411 A1 | 9/2004 | Murray |
| 2004/0174063 A1 | 9/2004 | Kocher |
| 2004/0217583 A1 | 11/2004 | Wang |
| 2004/0227390 A1 | 11/2004 | Schroth |
| 2004/0251367 A1 | 12/2004 | Suzuki et al. |
| 2005/0073187 A1 | 4/2005 | Frank et al. |
| 2005/0107932 A1 | 5/2005 | Bolz et al. |
| 2005/0127660 A1 | 6/2005 | Liu |
| 2005/0175253 A1 | 8/2005 | Li et al. |
| 2005/0179244 A1 | 8/2005 | Schroth |
| 2005/0206151 A1 | 9/2005 | Ashline |
| 2005/0284977 A1 | 12/2005 | Specht et al. |
| 2006/0071535 A1 | 4/2006 | Kim et al. |
| 2006/0075609 A1 | 4/2006 | Dingman et al. |
| 2006/0090313 A1 | 5/2006 | Muromachi et al. |
| 2006/0097095 A1 | 5/2006 | Boast |
| 2006/0237573 A1 | 10/2006 | Boelstler et al. |
| 2006/0243070 A1 | 11/2006 | Van Druff et al. |
| 2006/0267394 A1 | 11/2006 | David et al. |
| 2006/0277727 A1 | 12/2006 | Keene et al. |
| 2007/0052255 A1 | 3/2007 | O'Connor |
| 2007/0080528 A1 | 4/2007 | Itoga et al. |
| 2007/0241549 A1 | 10/2007 | Boelstler et al. |
| 2007/0257480 A1 | 11/2007 | Van Druff et al. |
| 2008/0018156 A1 | 1/2008 | Hammarskjold et al. |
| 2008/0030013 A1 | 2/2008 | Burghardt |
| 2008/0054615 A1 | 3/2008 | Coultrup |
| 2008/0087754 A1 | 4/2008 | Aihara et al. |
| 2008/0093833 A1 | 4/2008 | Odate |
| 2008/0100051 A1 | 5/2008 | Bell et al. |
| 2008/0100122 A1 | 5/2008 | Bell et al. |
| 2008/0136246 A1 | 6/2008 | Salter |
| 2008/0172847 A1 | 7/2008 | Keene et al. |
| 2008/0224460 A1 | 9/2008 | Erez |
| 2009/0014991 A1 | 1/2009 | Smyth et al. |
| 2009/0069983 A1 | 3/2009 | Humbert et al. |
| 2009/0179412 A1 | 7/2009 | Gray et al. |
| 2009/0183348 A1 | 7/2009 | Walton et al. |
| 2009/0212549 A1 | 8/2009 | Jones |
| 2009/0241305 A1 | 10/2009 | Buckingham |
| 2010/0046843 A1 | 2/2010 | Ma et al. |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2010/0219667 A1 | 9/2010 | Merrill et al. |
| 2011/0010901 A1 | 1/2011 | Holler |
| 2011/0043402 A1 | 2/2011 | Sasakawa |
| 2011/0057500 A1 | 3/2011 | Walker et al. |
| 2011/0162175 A1 | 7/2011 | Gnesda et al. |
| 2012/0242134 A1 | 9/2012 | Siegel |
| 2012/0284966 A1 | 11/2012 | Greaves et al. |
| 2012/0292893 A1 | 11/2012 | Baca et al. |
| 2013/0127229 A1 | 5/2013 | Humbert |
| 2013/0212845 A1 | 8/2013 | Ford et al. |
| 2014/0230202 A1 | 8/2014 | Humbert et al. |

FOREIGN PATENT DOCUMENTS

| | | |
|---|---|---|
| CA | 2091526 A1 | 10/1993 |
| CA | 2112960 C | 12/2002 |
| CA | 2450744 A1 | 2/2003 |
| DE | 4019402 A1 | 12/1991 |
| DE | 69019765 T2 | 7/1995 |
| DE | 4421688 C1 | 12/1995 |
| EP | 0026564 A1 | 4/1981 |
| EP | 0254383 A2 | 1/1988 |
| EP | 0363062 A2 | 4/1990 |
| EP | 0380442 A2 | 8/1990 |
| EP | 0401455 A1 | 12/1990 |
| EP | 0404730 A1 | 12/1990 |
| EP | 0449772 A1 | 10/1991 |
| EP | 0519296 A1 | 12/1992 |
| EP | 0561274 A1 | 9/1993 |
| EP | 0608564 A1 | 8/1994 |
| EP | 1153789 A2 | 11/2001 |
| EP | 1447021 A1 | 8/2004 |
| FR | 1298012 A | 7/1962 |
| GB | 888436 A | 1/1962 |
| GB | 1047761 | 11/1966 |
| GB | 1582973 A | 1/1981 |
| GB | 2055952 A | 3/1981 |
| GB | 2356890 A | 6/2001 |
| JP | 52055120 A | 5/1977 |
| JP | 63141852 A | 6/1988 |
| JP | 63247150 A | 10/1988 |
| JP | 10119611 A | 5/1998 |
| JP | 2001138858 A | 5/2001 |
| WO | 8603386 A | 6/1986 |
| WO | 03009717 A2 | 2/2003 |
| WO | 2004004507 A1 | 1/2004 |
| WO | 2006041859 | 4/2006 |
| WO | 2010027853 A1 | 3/2010 |

(56) References Cited

OTHER PUBLICATIONS

Global Seating Systems LLC, "CCOPS Cobra: Soldier Survival System," 1 page, undated. [Color Copy].
Holmbergs, "Art.no. 63/4959-XX and 63/4958-XX GR.1 Buckle, 3/5 point," accessed Sep. 15, 2010, www.holmbergs.se, 2 pages.
Holmbergs, "Gr. 0+ 3-point buckle with plastic chassi and tongues," accessed Sep. 15, 2010, http://www.holmbergs.se/1/1.0.1.0/70/1/, 1 page.
Holmbergs, "Gr. 1 Buckle, Viking," accessed Sep. 15, 2010, http://www.holmbergs.se1/1/1.0.1.0/53/1/, 1 page.
Holmbergs, "Group 1 Systems," accessed Sep. 15, 2010, http://www.holmbergs.se/1/1.0.1.0/87/1/, 1 page.
Holmbergs, "Infant buckle with steel tongues," accessed Sep. 15, 2010, http://www.holmbergs.se/1/1.0.1.0/74/1/, 1 page.
Holmbergs, "Infant buckle. 5-point with plastic chassi and plastic tongues," accessed Sep. 15, 2010, http://www.holmbergs.se/1/1.0.1.0/73/1/, 1 page.
International Search Report and Written Opinion; Application No. PCT/US2015/066190; dated Mar. 2, 2016; 10 pages.
Novarace, "DL: Group 1 Buckle," accessed Sep. 15, 2010, http://www.novarace.com/index.php?option=com_content&task=view&id=36&Itemid=48, 1 page.
Novarace, "GT 3: Group 0 Buckle," accessed Sep. 15, 2010, http://www.novarace.com/index.php?option=com_content&task=view&id=33&Itemid=46, 1 page.
Novarace, "GT 5: Group 0 Buckle," accessed Sep. 15, 2010, http://www.novarace.com/index.php?option=com_content&task=view&id=30&Itemid=44, 1 page.
Novarace, "GT: Group 1 Buckle," accessed Oct. 8, 2010, http://www.novarace.com/gt.htm,1 page.
Novarace, "KMA 1: Group 1 Buckle," accessed Sep. 15, 2010, http://www.novarace.com/index.php?option=com_content&task=view&id=34&Itemid=47, 1 page.
Sabelt Catalog, "SAB104: Standard tongue hole to facilitate webbing insert," p. 23, 1 page.
Sabelt, "Daphne 0: Fiberglass-plastic buckle with metal pin latch," accessed Sep. 15, 2010, http://childsafety.sabelt.com/index.php/eshop/product/Sabelt-Racing-DAPHNE-0.html/1/, 1 page.
Sabelt, "RO1000: Fiberglass-plastic buckle with metal pin latch," accessed Sep. 15, 2010, http://childsafety.sabelt.com/index.php/eshop/product/Sabelt-Racing_RO1000.html/1/pid/1,1 page.
Sabelt, "SAB004: Fiberglass-plastic buckle with metal pin latch," accessed Sep. 15, 2010, http://childsafety.sabelt.com/index.php/eshop/product/Sabelt-Racing-SAB004.html/1/pid/1, 1 page.
Sabelt, "SABUSA004: Fiberglass-plastic buckle with metal pin latch," accessed Sep. 15, 2010, http://childsafety.sabelt.com/index.php/eshop/product/Sabelt-Racing-SABUSA004.html/1/, 1 page.

\* cited by examiner

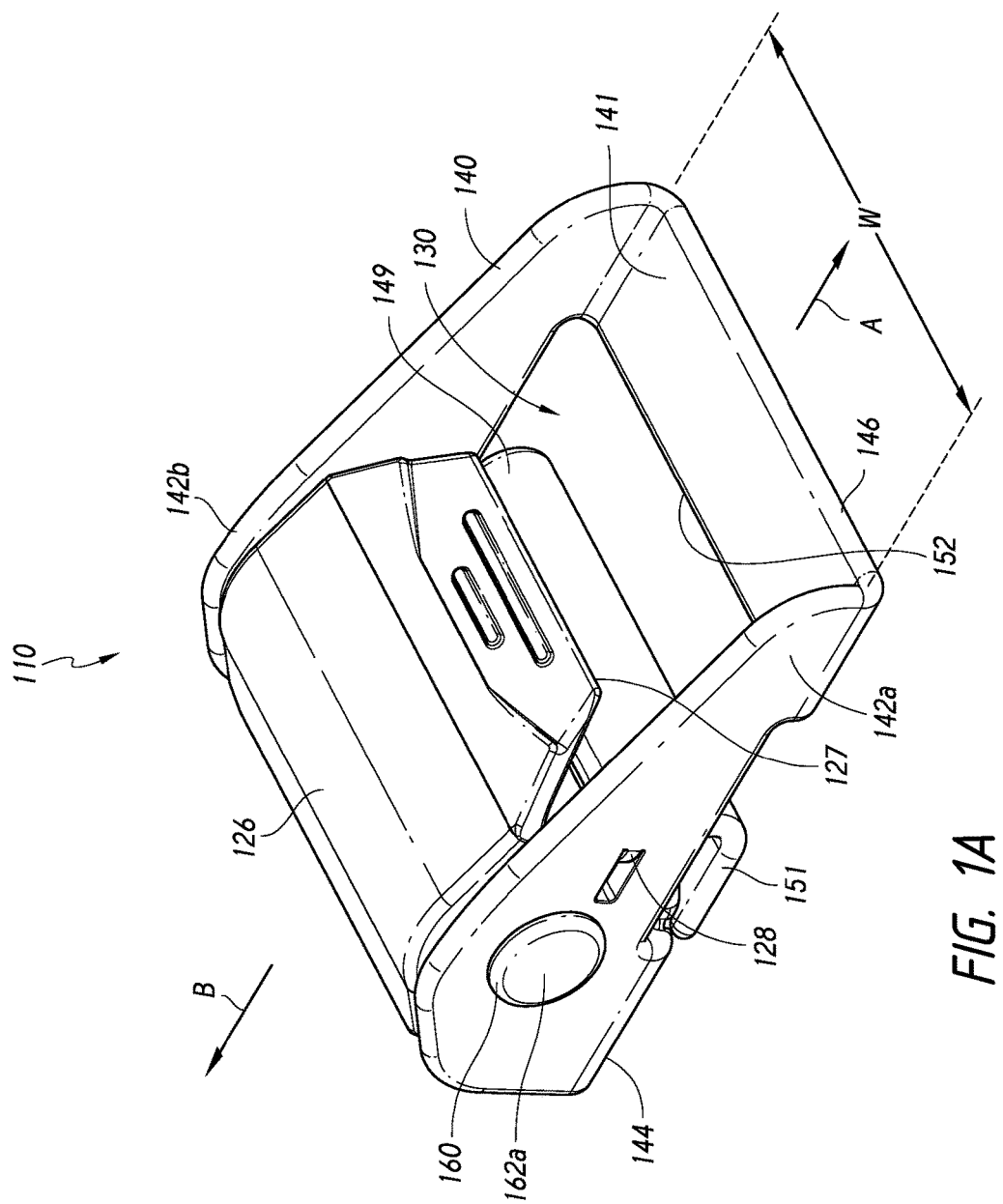

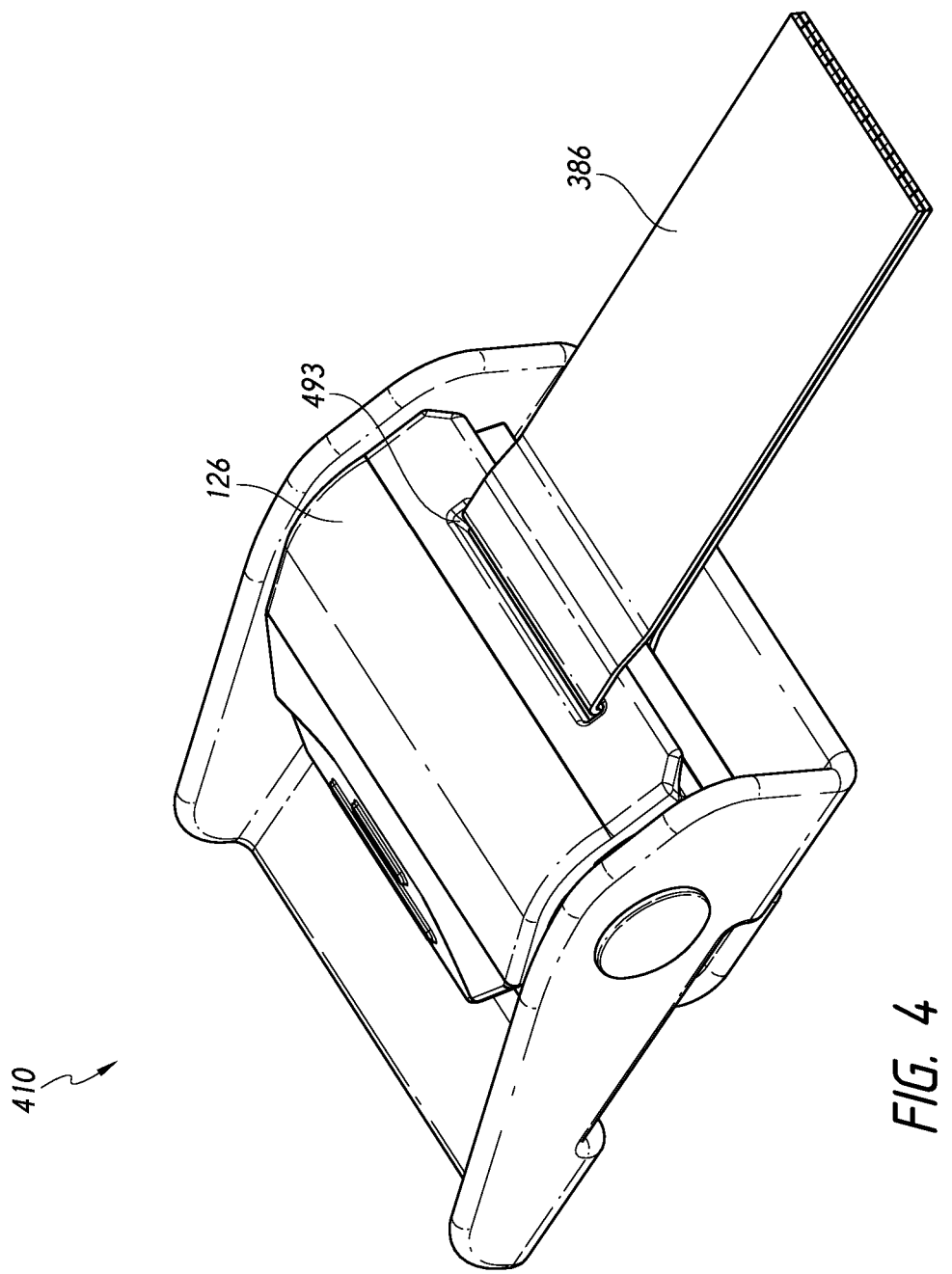

WEB ADJUSTERS FOR USE WITH RESTRAINT SYSTEMS AND ASSOCIATED METHODS OF USE AND MANUFACTURE

CROSS-REFERENCE TO RELATED APPLICATION

The present application claims priority to U.S. Provisional Application No. 62/092,769, filed Dec. 16, 2014, and titled WEB ADJUSTERS FOR USE WITH RESTRAINT SYSTEMS AND ASSOCIATED METHODS OF USE AND MANUFACTURE, the disclosure of which is incorporated herein by reference in its entirety.

TECHNICAL FIELD

The present technology relates generally to web adjusters for use with restraint systems and, more particularly, to web adjusters for use with personal restraint systems for securing an occupant in a seat of a vehicle.

BACKGROUND

Various types of restraint systems are known for restraining an occupant in an automobile, aircraft, or other vehicle. Generally, personal restraint systems for use in vehicles include one or more web adjusters for adjusting the tension in, for example, the shoulder straps, harnesses and/or the lap straps so that they fit snugly around an occupant using the restraint system. Many utility vehicles ("UTVs") and other types of recreational vehicles (e.g., "side by side" ATVs, etc.) include seatbelt or personal restraint systems. These types of vehicles are often used in and/or are open to harsh environments in which a web adjuster and other components of the personal restraint system may be exposed to dirt, mud, debris, snow, ice, water, etc. during use. Accordingly, it would be advantageous to provide a web adjuster having reduced manufacturing costs, an ergonomic design, increased service life, and/or improved functionality in harsh environments.

BRIEF DESCRIPTION OF THE DRAWINGS

FIGS. 1A-1E are top isometric, front isometric, side, top and rear views, respectively, of a web adjuster configured in accordance with an embodiment of the present technology.

FIG. 4 is a top isometric view illustrating additional details of a web adjuster configured in accordance with another embodiment of the present technology.

DETAILED DESCRIPTION

Figure 1B:
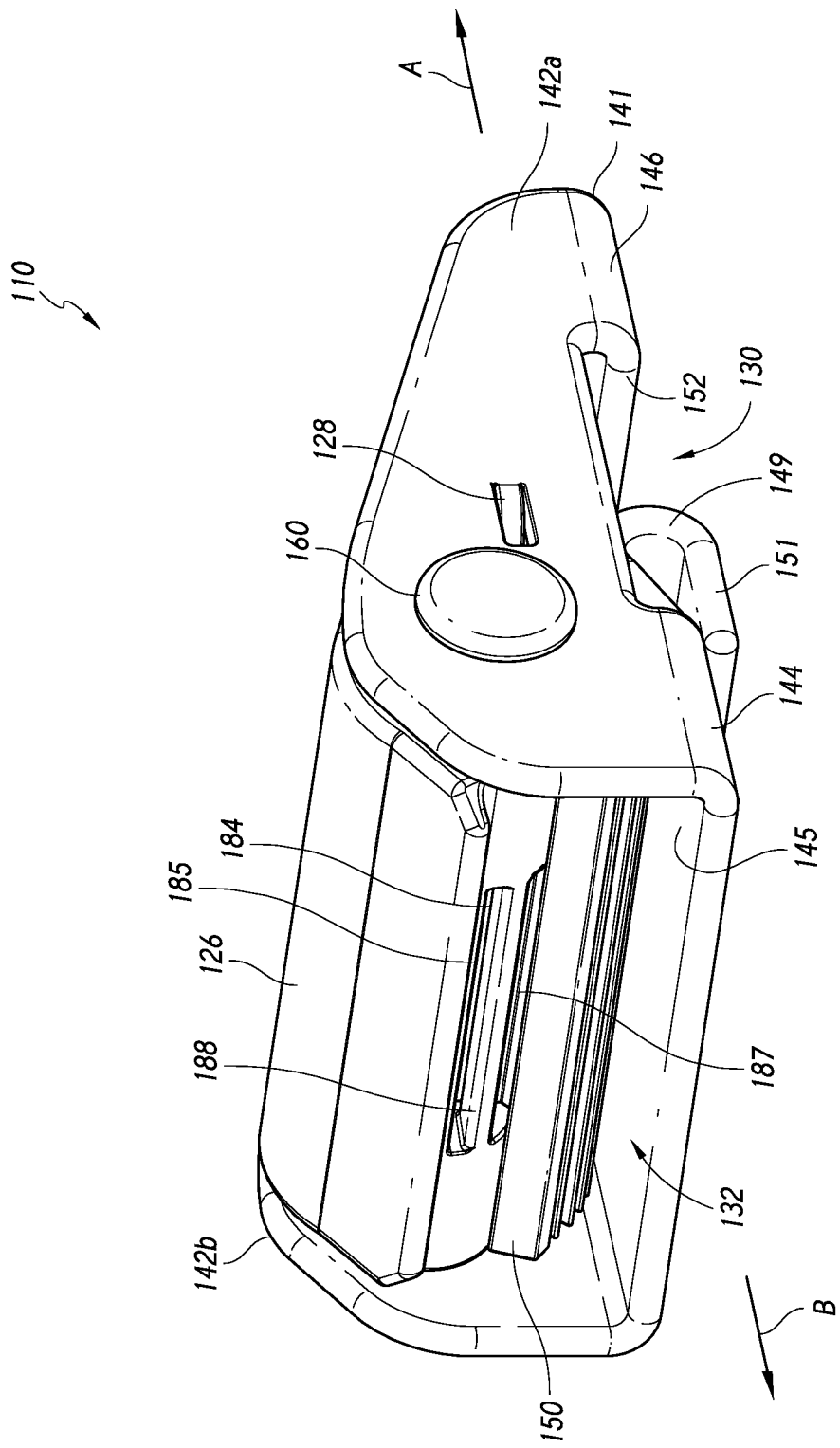
Figure 1C:
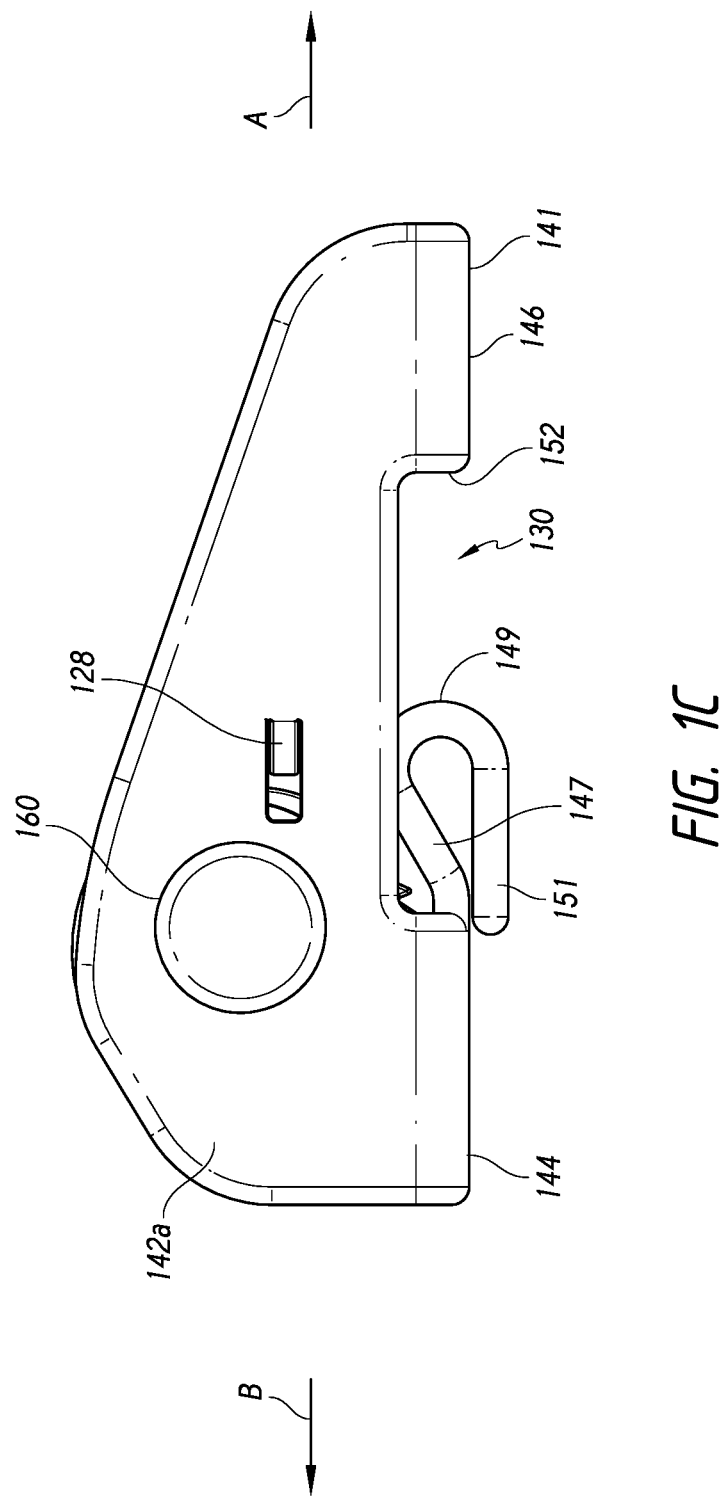
Figure 1D:
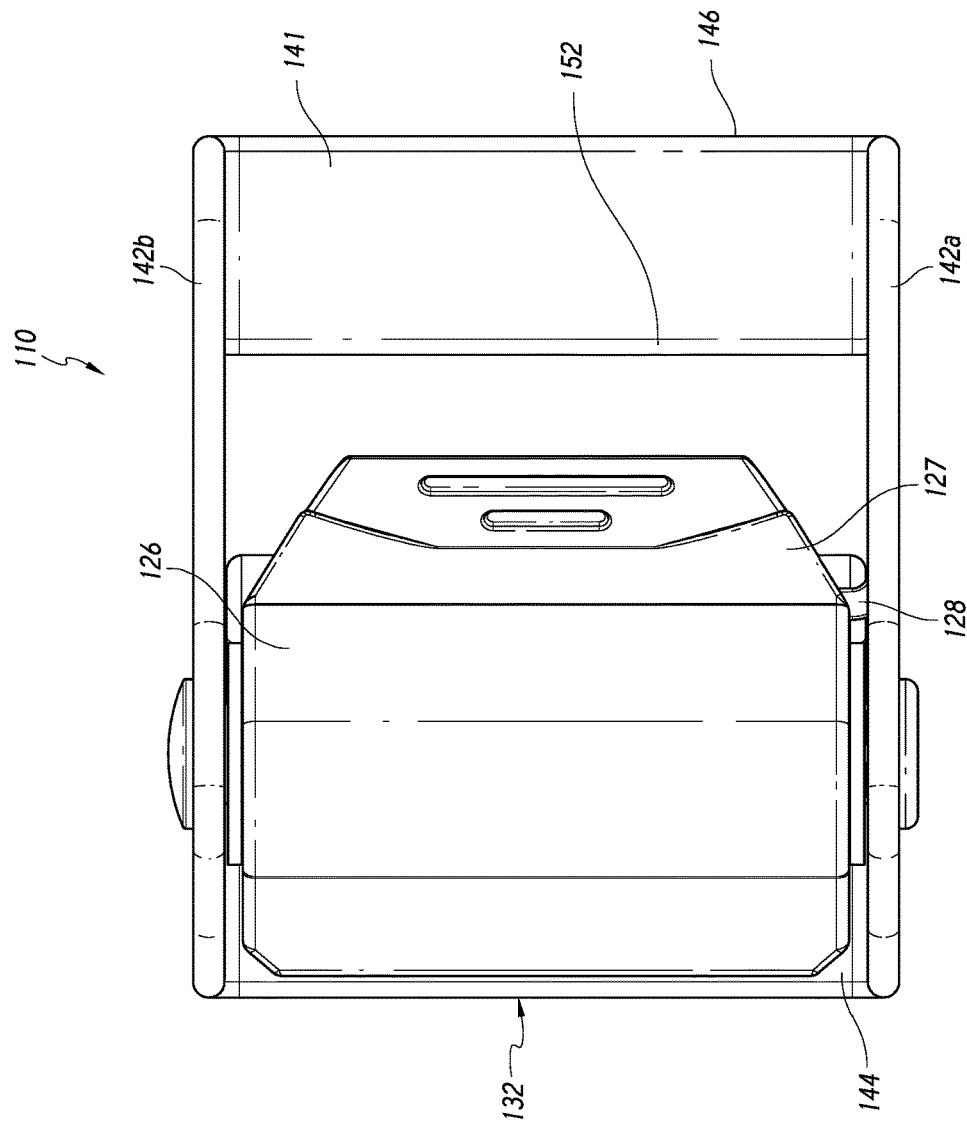
Figure 1E:
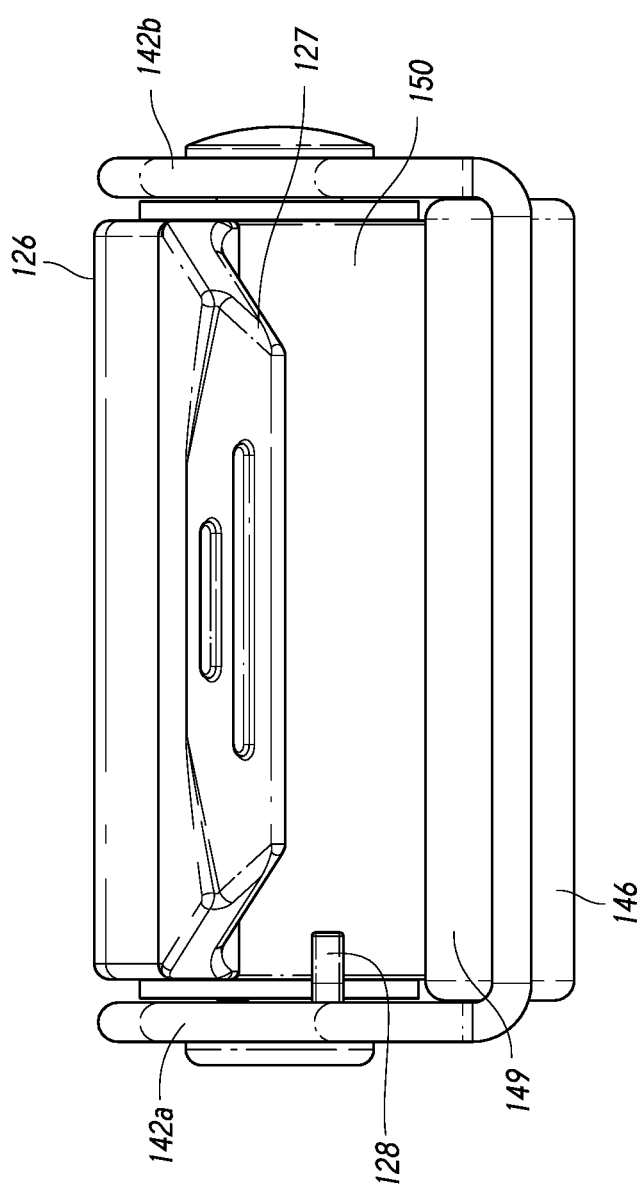

The present technology describes various embodiments of devices and systems for adjusting the length and/or tension of a web, such as a web, strap, harness and/or belt of a restraint system. In one embodiment, for example, a web adjuster includes a cam member having a plurality of engagement features (e.g., teeth, ridges, protrusions) on a portion thereof. The cam member is normally biased against the web so that the engagement features grip (e.g., engage and/or clamp) the web and prevent movement of the web in at least a first direction along its length. The cam member can be moved (e.g., pivoted or rotated) about a shaft extending through a bore in the cam member to move the engagement features away from the web and permit movement of the web in the first direction and a second direction, opposite the first direction. As described in greater detail below, the web adjuster can also include other features to enhance operation, improve ease of adjustment of the web in harsh environments, improve functionality with gloved hands and helmets, increase product life and/or reduce wear. Such features can include, for example, cam member engagement features that remove debris from a web during operation. Another feature can include a pull strap for ease of web adjustment during use in harsh environments when a user may have gloved hands and/or a helmet on.

Certain details are set forth in the following description and in FIGS. 1A-6 to provide a thorough understanding of various embodiments of the present technology. Other details describing well-known structures and systems often associated with web adjusters, restraint systems, seat harnesses, seatbelts, etc. have not been set forth in the following disclosure to avoid unnecessarily obscuring the description of the various embodiments of the present technology.

Many of the details, dimensions, angles and other features shown in the Figures are merely illustrative of particular embodiments of the present technology. Accordingly, other embodiments can add other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIGS. 1A-1E illustrate top isometric, front isometric, side, top and rear views, respectively, of a web adjuster 110 configured in accordance with an embodiment of the present technology. Referring to FIGS. 1A-1E together, in one aspect of this embodiment, the web adjuster 110 includes a frame 140 having parallel opposing sidewalls 142 (e.g., plates or flanges), identified individually as a first sidewall 142a and a second sidewall 142b, that extend upwardly from opposite sides of a base 141. The sidewalls 142a and 142b can be spaced apart by a selected distance W, depending on the width of the particular web being used. For example, in one embodiment the sidewalls 142a and 142b can be spaced apart by a distance W of about 2 inches to accommodate a web width of about 1.9 inches. In other embodiments, the web adjuster 110 can be shaped and sized to accommodate other sizes, shapes and/or types of webs.

In the illustrated embodiment, a cam member 150 is movably (e.g., pivotally or rotatably) mounted to the sidewalls 142a and 142b by a cylindrical shaft 160. The shaft 160 provides a fixed axis of rotation for the cam member 150. In other embodiments, the shaft 160 can have a non-cylindrical shape.

The base 141 can include a forward or front portion 144 spaced apart from a rear portion 146 by a generally rectangular-shaped first opening 130 (e.g., an aperture, a passage or slot). As shown in, e.g., FIG. 1B, a second opening 132 is formed between the sidewalls 142a and 142b, the cam member 150, and the front portion 144. As described in greater detail below with reference to FIGS. 5A and 5B, the second opening 132 is configured to receive a first web 520 (e.g., a strap, belt or harness) that extends rearwardly (i.e., in a first linear direction identified by an arrow A) through the second opening 132 along the front portion 144, and then downward through the first opening 130.

In the illustrated embodiment, the front portion 144 can include a first horizontal surface portion 145, a ramped surface portion 147 (e.g., an inclined or sloped surface portion) that extends rearwardly from the first horizontal surface portion 145, and a curved surface portion 149. The curved surface portion 149 extends transversely between the sidewalls 142a and 142b and forms a first edge portion of the first opening 130. The rear portion 146 includes a second edge portion 152 of the first opening 130 that is opposite the curved surface portion 149 and provides a smooth surface for a second web 521 (see FIGS. 5A and 5B) to rub against as it moves relative to the frame 140, thereby reducing friction and associated abrasion and wear on the second web 521. The curved surface portion 149 extends between the ramped surface portion 147 and a second horizontal surface portion 151 that extends forwardly (i.e., in a second linear direction identified by an arrow B) at least partially beneath the ramped surface portion 147 and/or the first horizontal surface portion 145.

In the illustrated embodiment, the web adjuster 110 includes a movable handle 126 (e.g., a latch or lever) operably coupled to the cam member 150. As described in more detail below, movement of the handle 126 moves the cam member 150 to engage and disengage the cam member 150 from the first web 520. The handle 126 can include one or more strap passages 184 for receiving and securing a strap (e.g., a web, harness or belt). As illustrated in FIG. 1B, the passage 184 is positioned below an upper surface of the handle 126, and extends from a first opening 185 to a second opening 187 and around a bar portion 188 to provide a structure a strap can be looped around and secured to.

In the illustrated embodiment, the first sidewall 142a can include a projection or protrusion 128 extending inwardly towards the second sidewall 142b. The protrusion 128 can be formed directly out of the sidewall 142a by cutting and deflecting a portion of the sidewall 142a inwardly. In other embodiments, the protrusion 128 can be coupled or attached to sidewall 142a in other ways. In other embodiments, the protrusion 128 can extend inwardly from the second sidewall 142b, or both sidewalls 142a and 142b can each include a protrusion 128. As described in greater detail below with reference to FIGS. 5A and 5B, the protrusion 128 can act as a stop member for limiting a maximum movement (e.g., rotation) of the handle 126 when a user or occupant rotates the handle 126.

Figure 2A:
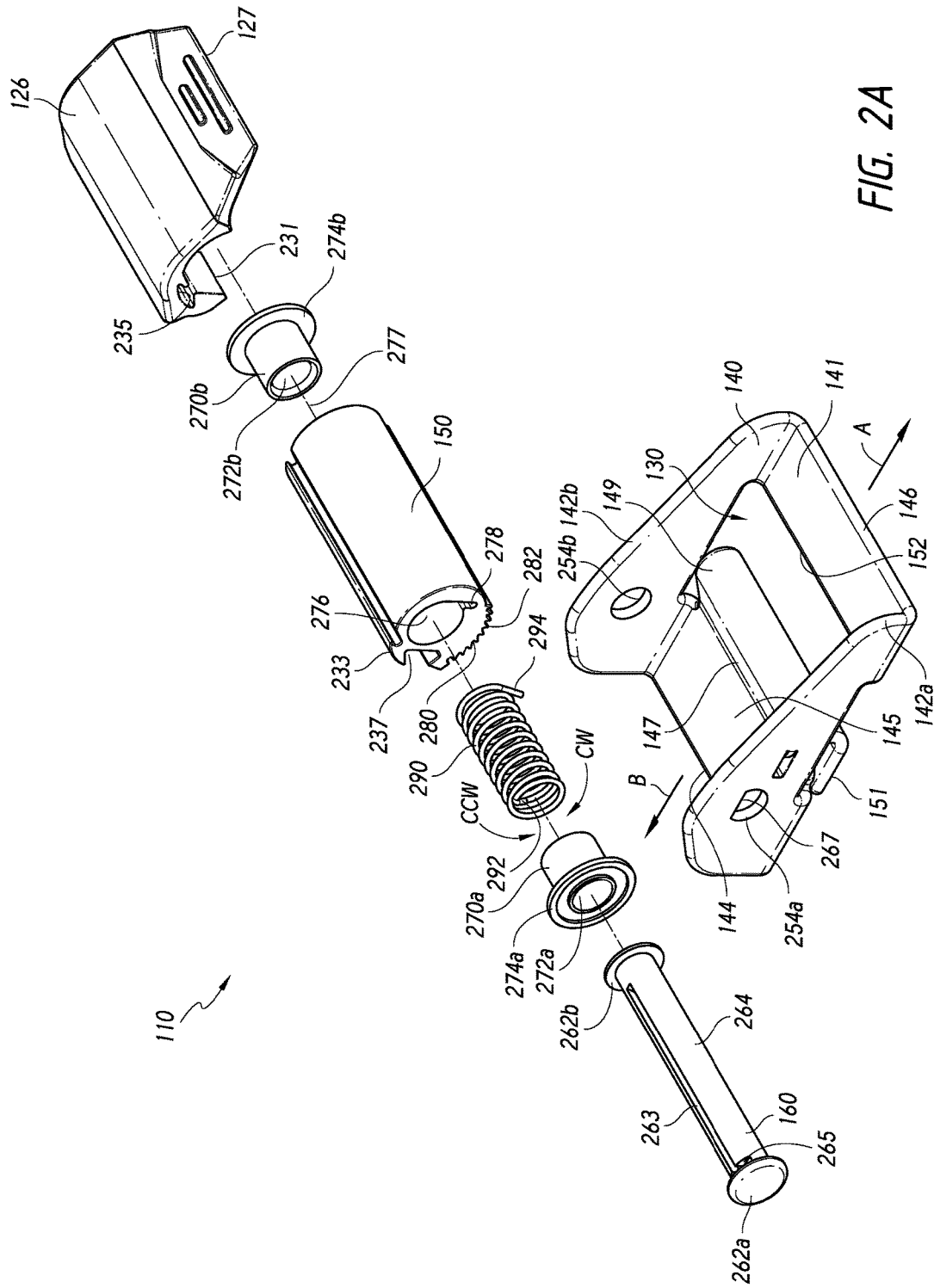
FIGS. 2A and 2B are an exploded top isometric view and an exploded bottom isometric view, respectively, of the web adjuster of FIGS. 1A-1E.
Figure 2B:
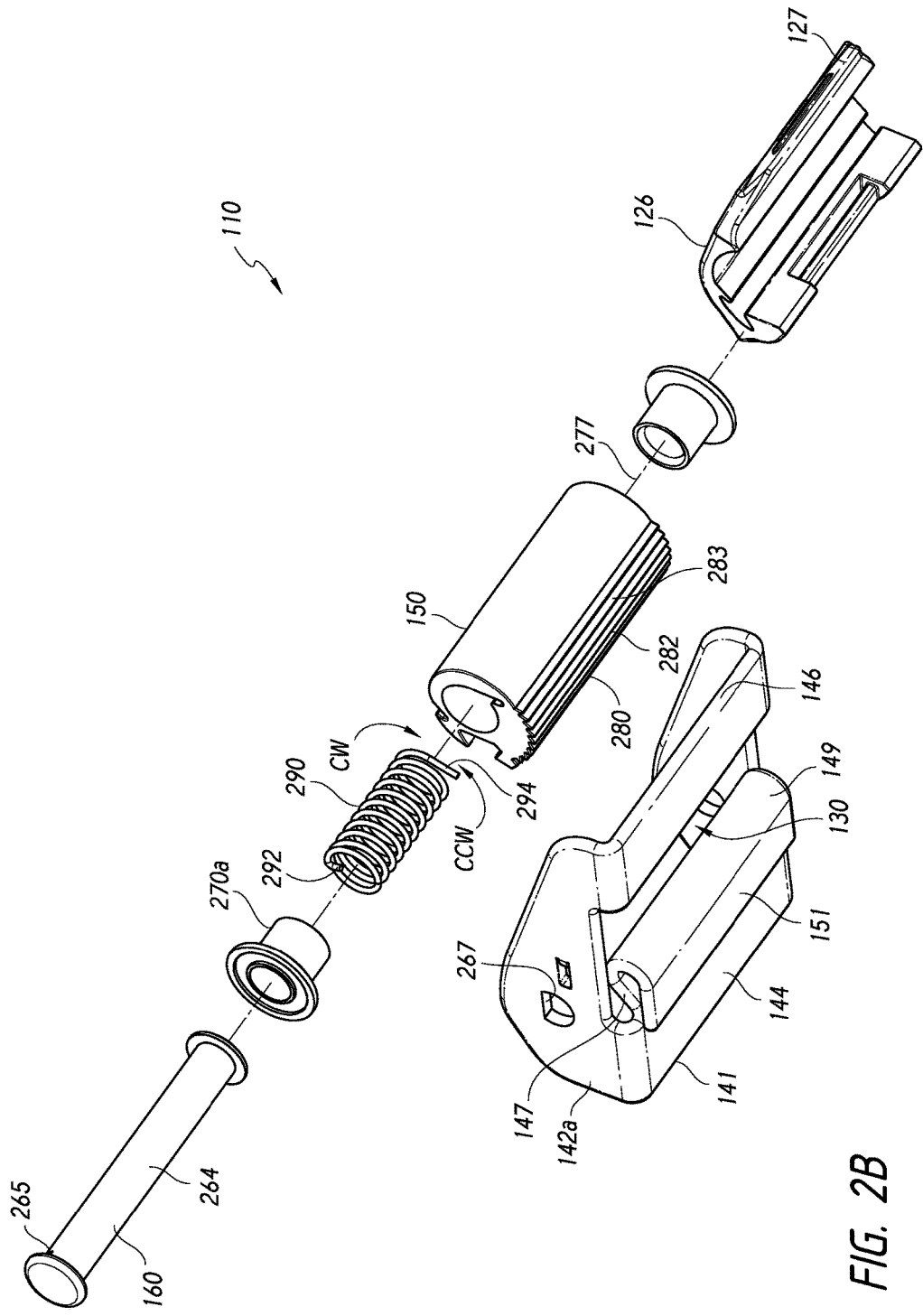

FIGS. 2A and 2B are exploded top and bottom isometric views, respectively, of the web adjuster 110 configured in accordance with an embodiment of the present technology. Referring to FIG. 2A, aligned pin bores 254 (identified individually as a first pin bore 254a and a second pin bore 254b) extend through each of the side flanges 142a and 142b, respectively, and are configured to operably receive and support the shaft 160. A pin bore, e.g., the first pin bore 254a includes a flat or generally flat edge portion 267 configured to bear against a complimentary flat portion 265 of the shaft 160 to hold the shaft 160 in angular position relative to the frame 140. In the illustrated embodiment, the frame 140 can be formed from suitable materials known in the art, such as steel plate that is bent or otherwise formed to shape. In other embodiments, the frame 140 can be made from other suitable materials, including other metals that are cast, machined, etc., and/or non-metallic materials.

In the illustrated embodiment of FIGS. 2A and 2B, the shaft 160 is a solid or generally solid pin having a cylindrical body portion 264 extending between flange or head portions 262a and 262b at opposing ends of the body portion 264. One or both head portions 262a and 262b can be coupled (e.g., secured, fastened or assembled) to the body portion 264 and/or formed on the body portion 264 after installing other components of the web adjuster 110 onto the shaft 160 and installing the shaft 160 in position on the frame 140 as described in more detail below. In other embodiments, the shaft 160 can be at least partially hollow and/or have other shapes. The shaft 160 can include a channel 263 (e.g., a slot or recess) extending lengthwise along at least a portion of the shaft 160 for receiving, accommodating, and/or securing at least a portion of a biasing member 290. The flat portion 265 extends transverse or generally transverse to the channel 263 at an end portion of the shaft 160. The shaft 160 can be made from various types of suitable materials known in the art, such as plated steel. In other embodiments, the shaft 160 can be made from other suitable materials including other metal and non-metallic materials.

In one aspect of this embodiment, the web adjuster 110 further includes cylindrical bushings 270 (identified individually as a first bushing 270a and a second bushing 270b) configured to receive the shaft 160 and insert into opposite ends of a cam bore 276 formed in the cam member 150. The bushings 270a and 270b can include a protruding flange or head portion 274 (identified individually as a first head portion 274a and a second head portion 274b) at one end, and a pin bore 272 (identified individually as a first pin bore 272a and a second pin bore 272b) extending centrally and axially therethrough to receive the shaft 160. The bushings 270a and 270b can reduce wear and/or increase the durability and strength of the web adjuster 110. The bushings 270a and 270b can be made from various materials known in the art for reducing friction and/or wear between the cam member 150 and the shaft 160 during operation of the web adjuster 110. For example, the bushings 270a and 270b can be manufactured from a durable plastic material (such as acetal, polypropylene, etc.) Delrin, Teflon, nylon, and/or other suitable nonmetallic materials known in the art. In yet other embodiments, the bushings 270a and 270b can be manufactured from a suitable metallic material, such as bronze, stainless steel, etc.

In the illustrated embodiment, the outer diameter of the shaft 160 is configured to fit through the pin bores 272a and 272b with a slight clearance fit to permit free rotation of the parts with minimal, or at least little radial movement, and the outer diameter of the bushings 270a and 270b are configured to fit snugly into the cam bore 276 with a light press fit. Moreover, the bushings 270a and 270b do not extend all the way through the cam bore 276 and contact each other, providing room between the bushings 270a and 270b to accommodate the biasing member 290 that fits around the shaft 160 and is positioned within the cam bore 276.

In the illustrated embodiment, the biasing member 290 is configured to be operably coupled to the shaft 160 and the cam member 150 when these parts are assembled on and/or to the frame 140. For example, a second end portion 294 of the biasing member 290 is inserted into a slot 278 (e.g., a notch, groove or recess) in the cam bore 276 as the biasing member 290 is inserted into the cam bore 276. Additionally, a first end portion 292 of the biasing member 290 is received within and engages the channel 263 in the shaft 160 as the shaft 160 is inserted axially through the center of the biasing member 290. In the illustrated embodiment, the biasing member 290 is a helical torsion spring made of suitable wire that resiliently biases the cam member 150 in a first rotational direction (e.g., a counterclockwise direction CCW) toward the engaged position.

Figure 2C:
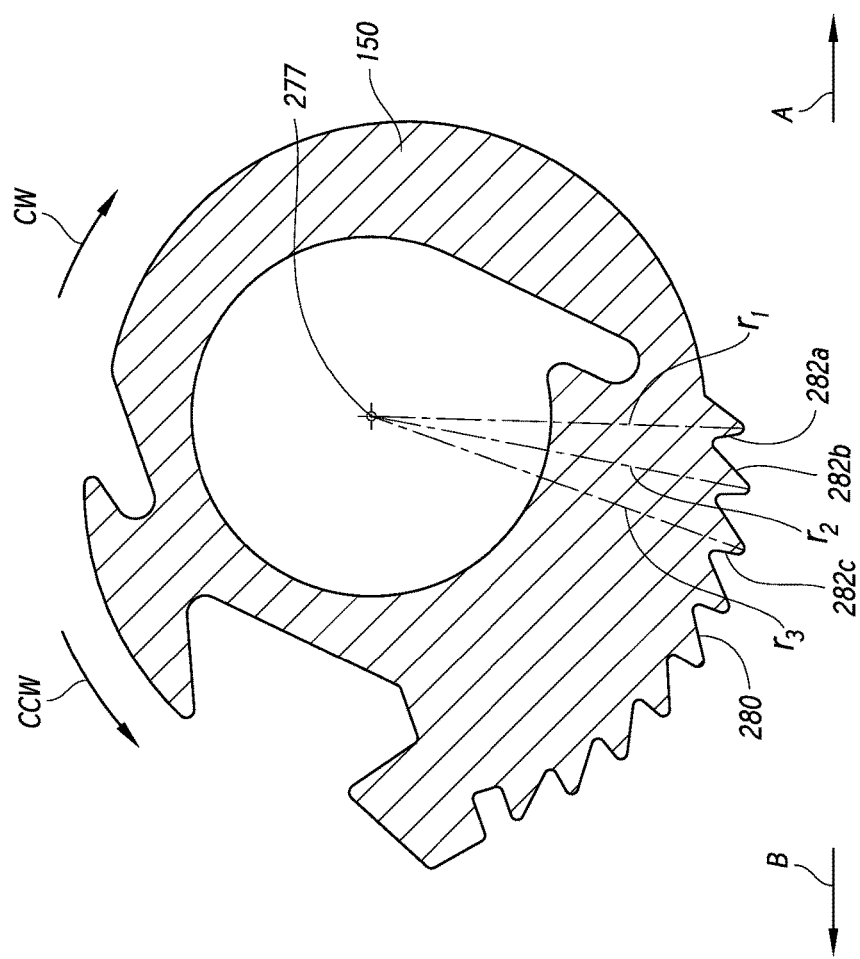
FIG. 2C is an enlarged cross-sectional side view of a cam member configured in accordance with an embodiment of the present technology.

FIG. 2C is an enlarged cross-sectional side view of the cam member 150 configured in accordance with an embodiment of the present technology. In one aspect of the illustrated embodiment, the cam member 150 includes a cam surface portion 280 having a plurality of engagement features 282 (e.g., transverse teeth, ridges, or protrusions). The engagement features 282 extend radially outwardly with respect to a central axis 277, and the engagement features 282 are individually angled or slanted toward the second direction B. That is, the engagement features 282 are angled or slanted in a second rotational direction (e.g., in a clockwise direction CW), opposite to the first rotational direction. As used herein, the terms counterclockwise CCW (first rotational direction), and clockwise CW (second rotational direction), generally refer to rotational directions with reference to the views of the web adjuster 110 and the components thereof shown and correspondingly annotated in several of the figures. It is to be understood, however, that views of the web adjuster 110 and the components thereof from an opposite direction would include opposite use of these terms (e.g., substitution of the term counterclockwise CCW (first rotational direction) for the term clockwise CW (second rotational direction), and vice-versa).

The cam surface portion 280 is eccentrically oriented (e.g., offset) relative to a central axis 277 of the cam bore 276. More specifically, all or at least a portion of the engagement features 282 are not equidistant from the central axis 277, with individual engagement features 282 being positioned progressively further away from the central axis 277 as the cam surface portion 280 extends in the clockwise direction CW. For example, referring to FIG. 2C, a first engagement feature 282a, a second engagement feature 282b, and a third engagement feature 282c are positioned at progressively further radial distances from the central axis 277. In particular, the first engagement feature 282a is positioned at a first radial distance $r_1$ from the central axis 277; the second engagement feature 282b is positioned at a second radial distance $r_2$, greater than the first radial distance $r_1$; and the third engagement feature 282c is positioned at a third radial distance $r_3$, greater than the second radial distance $r_2$. In several embodiments, at least a portion of the cam surface portion 280 includes an involute cross-sectional shape. In one example, the cam surface portion 280 can have a cross-section that at least partially follows an involute curve (i.e., an involute curve can be drawn through a cross-section of the engagement features 282).

Figure 5A:
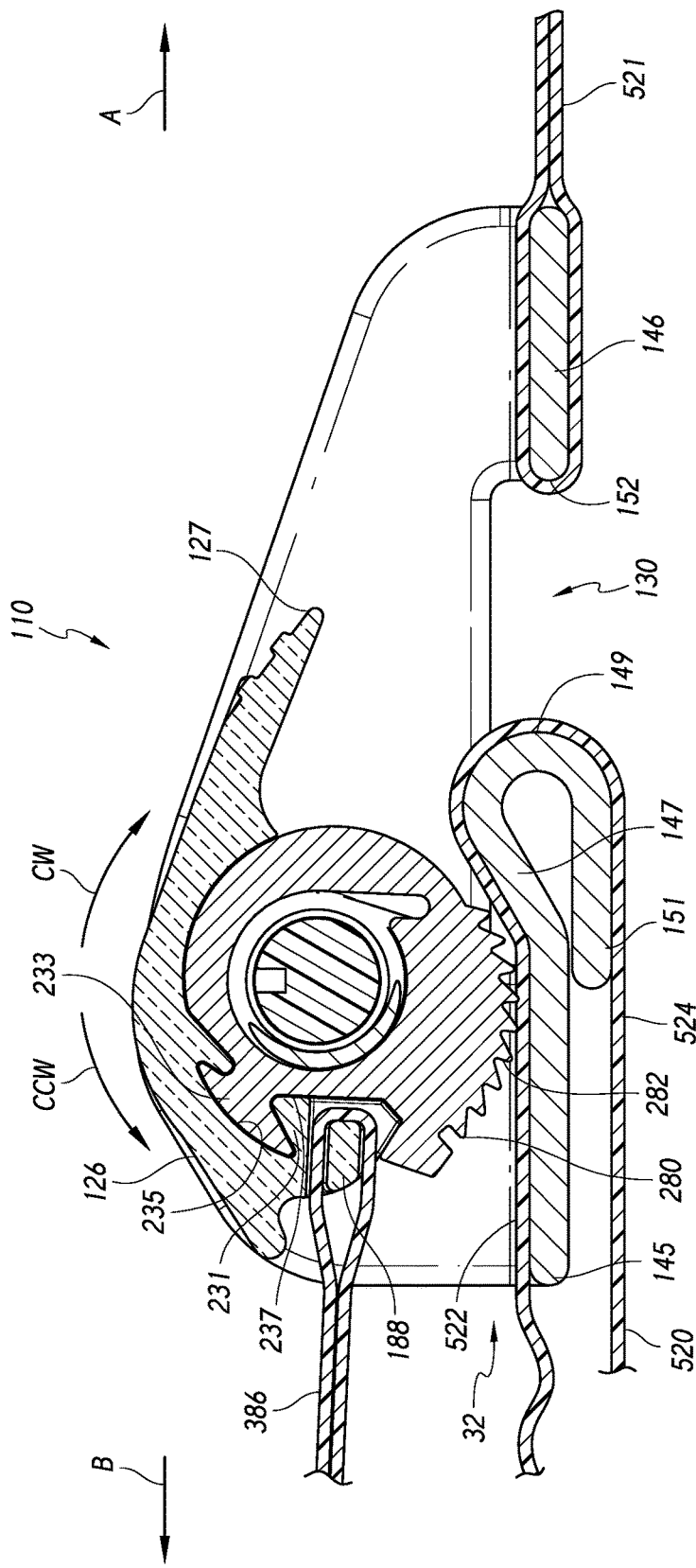
FIGS. 5A and 5B are side cross-sectional views illustrating various stages of operation of the web adjuster of FIGS. 1A-1E.

In the illustrated embodiment, the handle 126 is formed separately from the cam member 150. In this embodiment, the handle 126 is secured to the cam member 150 by one or more mating projections and recesses in the handle 126 and the cam member 150. For example, as illustrated in FIGS. 2A and 5A, the cam member 150 includes a first projection 233 and a first recess or cavity 237, and the handle 126 includes a second projection 231 and a second recess or cavity 235. In the illustrated embodiment, the first projection 233 of the cam member 150 is received in the second recess or cavity 235 of the handle 126 and the second projection 231 of the handle 126 is received in the first recess or cavity 237 of the cam member 150 to securely couple (e.g., fixedly attach) the handle 126 to the cam member 150. In other embodiments, the handle 126 can be secured to the cam member 150 with bolts, rivets, adhesive and/or other suitable fasteners known in the art. In yet other embodiments, the handle 126 and the cam member 150 can be formed monolithically.

To install the cam member 150 on the frame 140, one of the bushings, e.g., the bushing 270a is inserted into a first end of the cam bore 276 until the head portion 274a contacts a sidewall of the cam member 150. The biasing member 290 can then be inserted into a second end of the cam bore 276 with the second end portion 294 positioned in the slot 278. The second bushing 270b can then be inserted into the second end of the cam bore 276 until the head portion 274b contacts the adjacent sidewall of the cam member 150. The handle 126 is then attached to the cam member 150. In other embodiments, the handle 126 can be attached to the cam member 150 prior to installation of the bushing 270a, the biasing member 290, and/or the bushing 270b in the cam member 150.

The cam member 150 is then installed on the frame 140 with the bores 272a, 272b and 276 axially aligned with the corresponding bores 254a, 254b. The head portion 262a must be removed from the shaft 160 before the shaft is inserted or the head portion 262a must be otherwise formed on the end of the shaft 160 after the shaft is inserted. The shaft 160 is then inserted through the bore 254b and the bore 272b towards the bores 272a and 254a. As the shaft 160 is being inserted, the first end portion 292 of the biasing member 290 is received in the channel 263 of the shaft 160. Prior to inserting the flat portion 265 on the shaft 160 through the bore 254a, the shaft 160 is rotated in the clockwise direction CW to preload the biasing member 290 in torsion, and then the flat portion 265 of the shaft 160 is inserted into the bore 254a such that the shaft 160 is fixed in position relative to the frame 140 and prevented from rotation while the cam member 150 is rotatably or pivotally mounted to the frame 140. In some embodiments, the shaft 160 can be rotated within a range from about 10 degrees to about 180 degrees to preload the biasing member 290 in torsion. In other embodiments, the shaft 160 can be rotated within a range from about 20 degrees to about 160 degrees. In other embodiments, the shaft 160 can be rotated within a range from about 30 degrees to about 120 degrees. In other embodiments, the shaft 160 can be rotated within other ranges to preload the biasing member 290. After the cam member 150 is movably mounted (e.g., coupled, secured or attached) on the frame 140, the head portions 262a and 262b can be inserted into the end portions of the shaft 160 or formed by e.g., peening or flaring the end portions to retain the shaft 160 on the frame 140 and pivotally or rotatably mount the cam member 150 to the frame 140.

Figure 3:
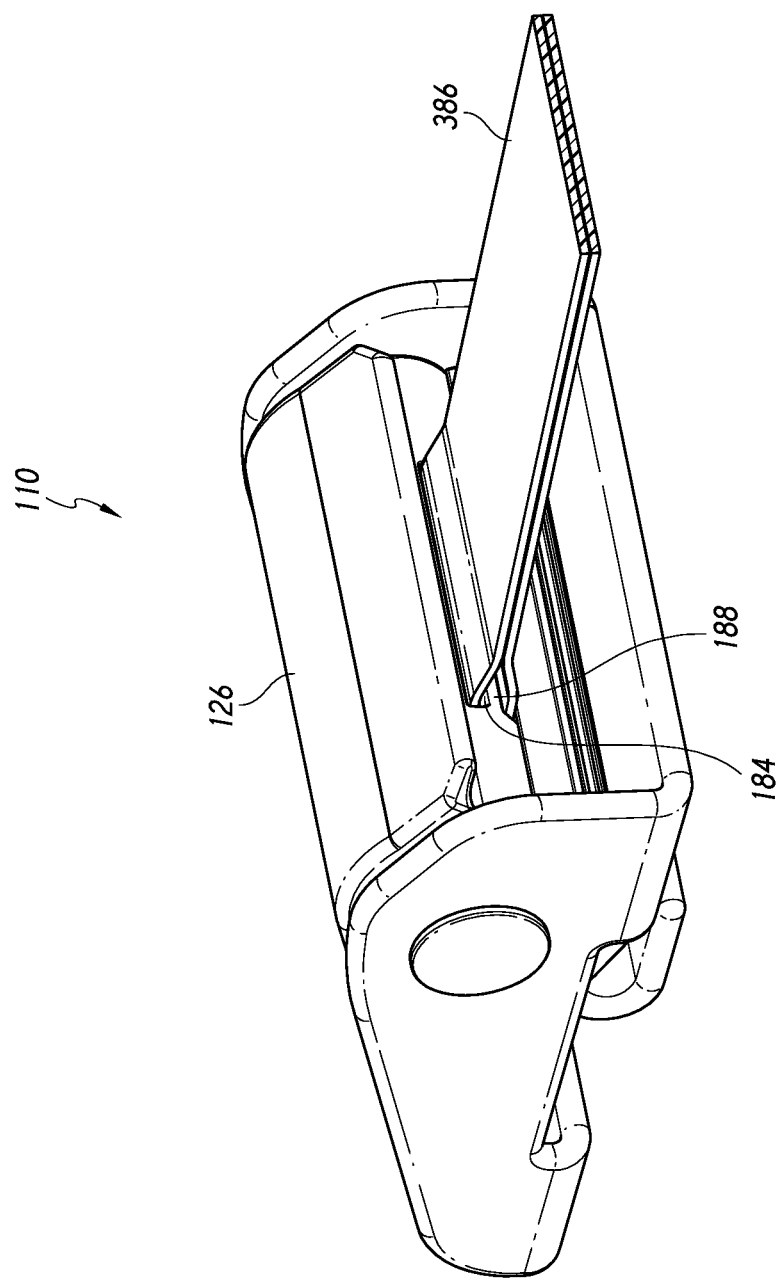
FIG. 3 is a front isometric view illustrating additional details of the web adjuster of FIGS. 1A-1E.

FIG. 3 is a front isometric view of the web adjuster 110 described in detail above. A strap 386 (e.g., a release strap or release web) can be passed through the passage 184 and secured to the handle 126. A user or occupant can grip the strap 386 and pull on it to move the handle 126 instead of gripping the handle 126 directly. FIG. 3 illustrates the strap 386 is attached to the handle 126 by passing the strap 386 around the bar member 188 through the passage 184 below an upper surface of the handle 126. In other embodiments, the strap 386 can be attached to other portions of the handle 126. For example, as illustrated in the top isometric view of a web adjuster 410 in FIG. 4, in some embodiments, the strap 386 can be passed through a passage 493 formed through an upper surface of the handle 126 and secured to the handle 126.

Figure 5B:
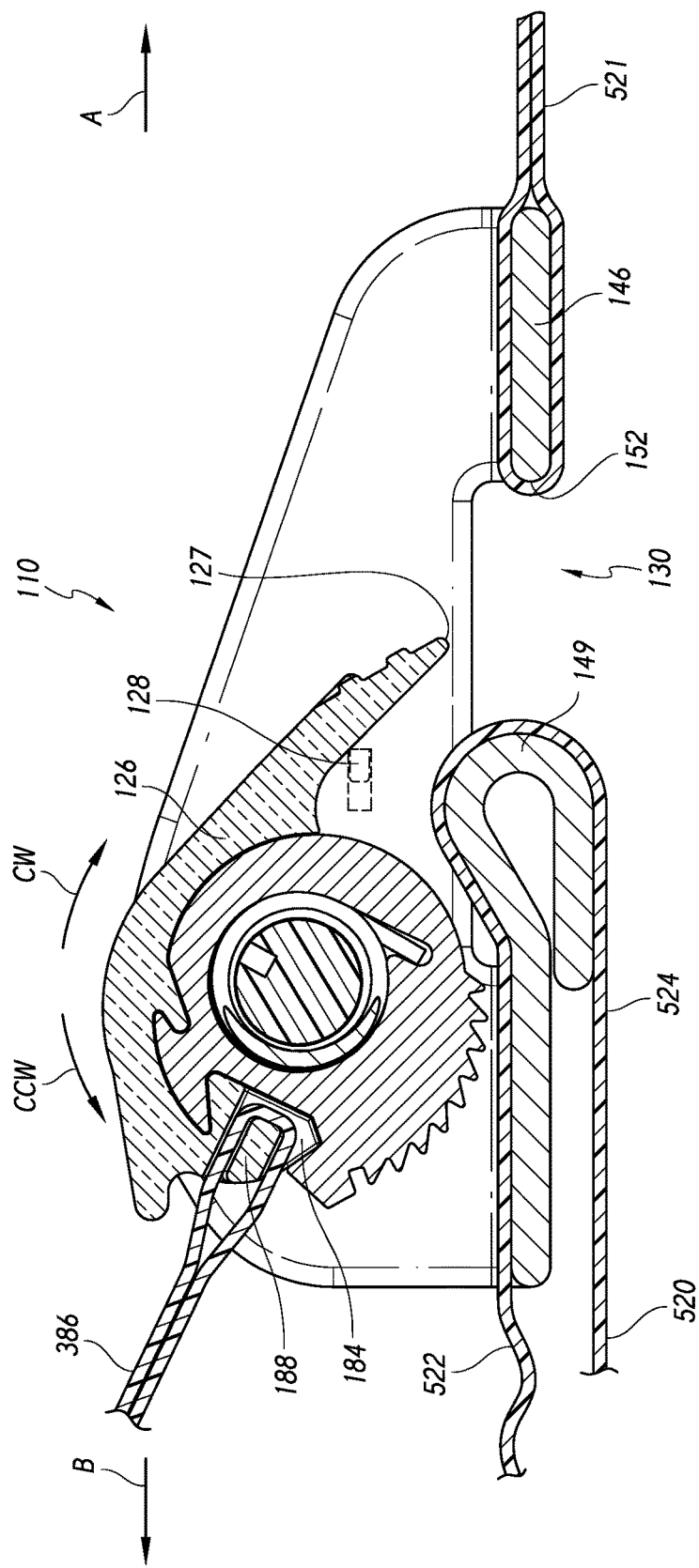

FIGS. 5A and 5B are cross-sectional side views illustrating two stages of operation and other features of the web adjuster 110 in accordance with an embodiment of the present technology. Referring to FIG. 5A, a first end portion 522 (e.g., a free end portion) of the first web 520 extends rearwardly through the second opening 132 in the web adjuster 110 between the cam surface portion 280 and the horizontal surface portion 145 in the first direction A. The first web 520 then follows the ramped surface portion 147 and wraps around the curved surface portion 149 as it exits the web adjuster 110 through the first opening 130. The curved surface portion 149 provides a smooth surface for the first web 520 to rub against as it moves or is adjusted relative to the frame 140, thereby reducing abrasion and wear on the first web 520. A second end portion 524 of the first web 520 then extends along the bottom of the second horizontal surface portion 151 in the second direction B opposite of the first direction A for connection to, e.g., a buckle, lap web, and/or other portion of the vehicle or restraint system. The second web 521 can be looped or wrapped around the lip or second edge portion 152 and fastened to itself to secure it to the rear portion 146 of the frame 140.

As illustrated in FIG. 5A, the biasing member 290 biases the cam member 150 in the counterclockwise direction CCW toward an engaged position to drive the engagement features 282 towards and/or against the base 141 of the frame 140, which clamps (e.g., grips) a portion of the first web 520 (e.g., the first end portion 522) firmly between the engagement features 282 and the adjacent base 141. Because of the biased cam member 150, the angle on the engagement features 282 and/or the eccentricity of the cam surface 280, pulling on the second end portion 524 of the first web 520 in the second direction B causes the engagement features 282 to drive against the web 520 with increased pressure and prevent, or at least substantially restrict, movement of the first web 520 (e.g., portion 522) in the first direction A, thereby preventing or at least substantially counteracting a decrease in tension of the web 520. For example, the engagement features 282 are generally angled toward the second direction B and directed downward toward the base 141 of the frame 140. The engagement features 282 are angled toward the direction B such that rotation of the cam member 150 in the counterclockwise direction CCW causes the engagement features 282 to drive against and grip the web 520 with increased pressure and prevent movement of the first end portion 522 in the first direction A when the second end portion 524 is pulled in the second direction B. Conversely, pulling the first end portion 522 of the web 520 in the second direction B causes the cam member 150 to rotate forward slightly and away from the base 141 in the clockwise direction CW, allowing the first end portion 522 of the first web 520 to be drawn in the second direction B and the second portion to be drawn in the first direction A (e.g., increasing tension in the first web 520).

The cam member 150 is thus spring-loaded and prevents the first end portion 522 from moving (e.g., from slipping or creeping) in at least one direction (e.g., the first direction A) when the cam member 150 is engaged with the first web 520. In some embodiments, this allows the web adjuster 110 to catch or grip the first web 520 to prevent it from moving (e.g., slipping or creeping) without requiring the use of locking and/or lifting bars. In other embodiments, the cam member 150 can be biased with other types of springs or suitable biasing members known in the art.

As illustrated in FIG. 5B, to permit an occupant or user (not shown) to adjust tension in the web 520 (e.g., of a shoulder strap or lap strap of a restraint system), the occupant or user pulls upwardly on a front portion of the handle 126 and/or the strap 386 to rotate the handle 126 in the clockwise direction CW to move the cam member 150 toward the disengaged position from the engaged position. The protrusion 128 of the frame 140 can contact a rear portion 127 of the handle 126 and prevent over-rotation of the handle 126 in the clockwise direction CW. This can stop the rear end portion 127 of the handle 126 from contacting or rubbing against the first web 520 and/or interfering with the movement of the first web 520 through the adjuster 110.

Pulling upwardly on the handle 126 and/or the strap 386 rotates the cam member 150 in the clockwise direction CW toward the disengaged position from the engaged position and releases the first web 520 (e.g., first end portion 522) from the grip of the cam member 150 for movement in either the first direction A or the second direction B. For example, the occupant or user can then pull the first end portion 522 of the first web 520 in the second direction B, which moves the second end portion 524 towards the first direction A, thereby increasing tension in the first web 520. Conversely, if the occupant or user pulls the second end portion 524 of the first web 520 in the second direction B, the first end portion 522 moves in the first direction A and decreases tension in the first web 520.

If the occupant or user wishes to prevent the movement of the web 520 in at least one direction (e.g., preventing movement of the first end portion 522 in at least the first direction A) to prevent decreasing tension in the first web 520, the occupant or user can release the handle 126 and/or strap 386 to move (e.g., return) the cam member 150 to the engaged position from the disengaged position. Releasing the handle 126 and/or strap 386 allows the biasing member 290 to rotate the cam member 150 in the counterclockwise direction CCW to engage (e.g., grip or clamp) the first web 520 and prevent movement of the first web 520 in at least one direction (e.g., movement of the first end portion 522 in at least the first direction A and the second end portion 524 in at least the second direction B). In the illustrated embodiments, the handle 126 can also prevent inadvertent contact by a user or occupant and/or debris with certain components of the web adjuster 110. For example, the handle 126 can extend over and cover at least certain portions of the web adjuster 110 (e.g., portions of the cam member 150).

In one aspect of the illustrated embodiment, the interaction of the cam member 150 with the web 520 can remove contaminants or debris (e.g., dirt, dust, snow, mud, ice, water, etc.) from the web during normal operation as the web 520 contacts and/or moves across the cam member 150. For example, the web 520 can move across or against the engagement features 282 as the handle 126 and/or strap 386 is lifted or released. Additionally, the web 520 can move across the cam member 150 when a user or occupant adjusts the tension in the web 520. As the web 520 moves across the surface of the cam member 150, the plurality of engagement features 282 can remove dirt or other debris from the web 520 and prevent a build-up of dirt or other debris on the web 520. This can provide the web adjuster 110 with a self-cleaning feature that can facilitate use in harsh environments. In harsh environments, some web adjusters have a tendency to get stuck or jammed and make adjustment more difficult. The self-cleaning feature can also provide for a greater product life of the web adjuster 110 by removing dirt or other debris.

In another aspect of the illustrated embodiment, the web adjuster 110 includes a strap 386. Rather than directly gripping the handle 126, a user can grip and pull the strap 386 to move the handle 126. The strap 386 can be particularly advantageous for occupants of vehicles used in harsh environments. For example, an occupant could have gloved hands on and/or a helmet on. The gloves can make it more difficult for an occupant to grip and/or move the handle 126 directly to adjust tension in the web. Additionally, a helmet can make it more difficult for an occupant to see the handle 126 of the web adjuster 110. Further, harsh environmental factors (e.g., dirt, mud, debris, snow, ice, water, etc.) can also make it more difficult for an occupant to grip, see and/or move the handle 126 directly. Accordingly, a strap 386 extending from the handle 126 as described herein can provide a more ergonomic design and/or improved functionality for web adjustment in harsh environments and/or by a user that has, for example, gloves and/or a helmet on. The strap 386 can provide a structure that can be easier to grip, maneuver, find and/or see than the handle 126.

Figure 6:
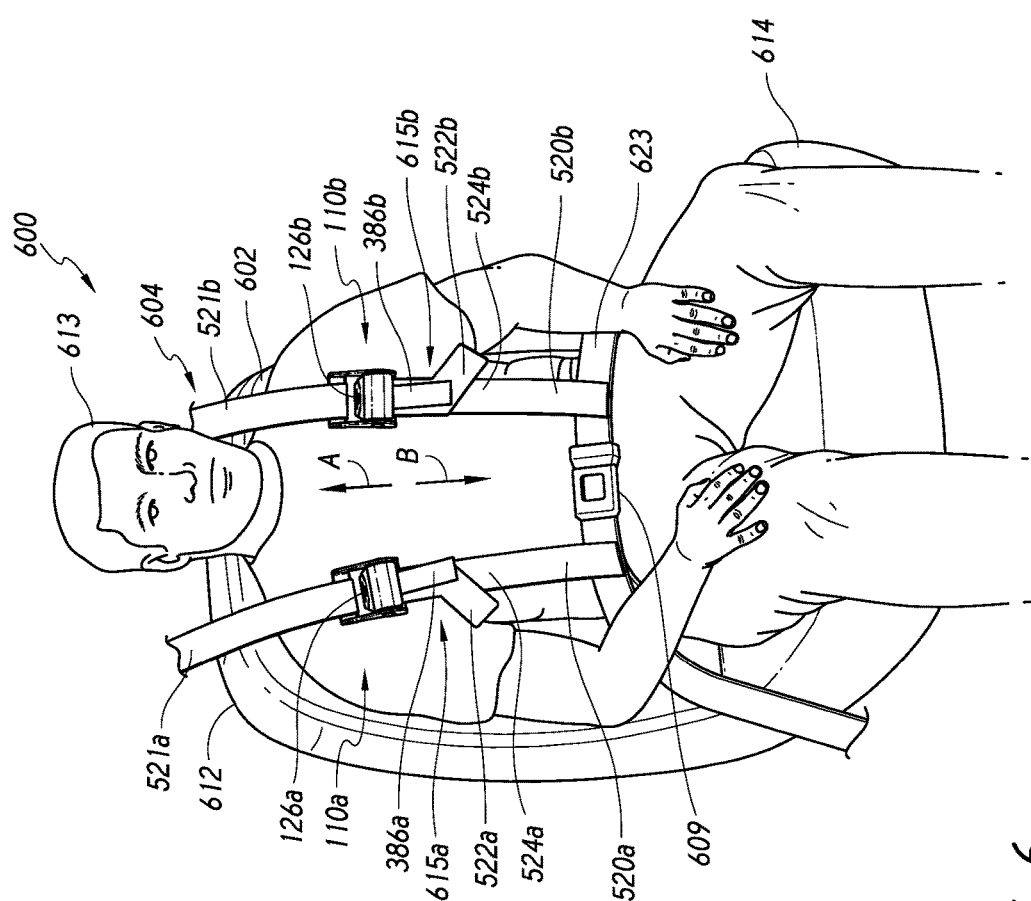
FIG. 6 is an isometric view of a restraint system having a web adjuster configured in accordance with an embodiment of the present technology.

FIG. 6 is a front isometric view of a personal restraint system 600 having two of the web adjusters 110 configured in accordance with an embodiment of the present technology. In the illustrated embodiment, the restraint system 600 includes a vehicle seat 602 having a back portion 612 extending upwardly from a seat portion 614. The seat 602 is configured to be secured to, e.g., a UTV or other vehicle (not shown) and accommodate a user or occupant 613. The occupant or user 613 can be secured to the seat 602 by a harness assembly 604 (e.g., a 4-point harness as illustrated, or a 3-point harness, 5-point harness or 6-point harness, etc.) that includes one or more shoulder straps or webs 615 (identified individually as a first shoulder web 615a and a second shoulder web 615b). Each of the shoulder webs 615 have two portions, respectively, e.g., the first web portion 520 (identified individually as first web portions 520a and 520b) and the second web portion 521 (identified individually as second web portions 521a and 521b) and are configured to extend over a respective shoulder of the user or occupant 613. A lap web 623 can extend around the waist of the user or occupant 613. A proximal end portion (not shown) of the second web portion 521 can be fixedly attached to an anchor point or points (not shown) on the vehicle, and/or to a web retractor (also not shown) attached to the vehicle behind the seat 602. In other embodiments, the second shoulder web portion 521 can be attached to other portions or components of e.g., the seat 602, the harness assembly 604, and/or the vehicle. The harness assembly 604 can be secured around the user or occupant 613 by attaching each of the shoulder webs 615a and 615b (e.g., distal ends of the first web portions 520a and 520b) to the lap web 623 and attaching the lap web 623 to a conventional buckle 609. In other embodiments, the shoulder webs 615a and 615b can be attached directly to and/or integrated with the lap web 623. In other embodiments, the shoulder webs 615a and 615b can be attached to the conventional buckle 609 or other types of buckles. The various webs described herein can include conventional webs known in the art for use with child seats, seat belts, etc., such as conventional woven nylon straps, belts or webs. In other embodiments, the web adjusters disclosed herein can be used with other types of webs, belts, straps, etc.

In the illustrated embodiment, each of the web adjusters 110 (identified individually as a first web adjuster 110a and a second web adjuster 110b) are attached to first and second web portions 520 and 521 as described above near the shoulder, chest and/or upper body area of the user 613. The first end portion 522a of the first web portion 520a is a free end that extends through the adjuster 110a. The user 613 can pull the free end portion 522a in the second direction B (see FIGS. 5A and 5B) to draw the second end portion 524a in the first direction A and through the adjuster 110a to tighten the harness assembly 604 (e.g., increase tension in the web 615a) around the user 613. As described above, the user can also move the handle 126 and/or pull the release strap 386 to move the cam member 150 to the disengaged position and pull on the second end portion 524a in the second direction B to draw the first end portion 522a in the first direction A and back through the adjuster 110a to loosen the harness assembly 604 (e.g., decrease tension in the web 615a) around the user 613.

While the function and/or operation of the first web adjuster 110a with the first shoulder web 615a is described with reference to FIG. 6 above, the second web adjuster 110b can be used and/or operated with the second shoulder web 615b configured to extend over a second shoulder of the user or occupant 613 in a similar or identical manner. In some embodiments, a similar web adjuster 110 can be used with waist or lap belts or straps (e.g., lap belt 623) of a harness assembly or other type of restraint system. In other embodiments, the web adjuster 110 is positioned near the stomach or waist area of the user 613.

Although the foregoing embodiment illustrates one possible use of the web adjuster 110, those of ordinary skill in the art will appreciate that the web adjuster 110 and/or other web adjusting devices disclosed herein can be used in a wide variety of different restraint systems. Such systems can include, for example, child restraint systems, adult restraint systems, cargo restraint systems, etc. The web adjuster 110 can be used with different types of harnesses, seatbelts, and webbing. For example, the web adjuster 100 can be used with lap belts, shoulder belts, racing harnesses, 3-point harnesses, 4-point harnesses, 5-point harnesses, etc. In another aspect of this embodiment, a web can extend between the cam member and the frame and can enter and exit the adjuster from either end of the frame, rather than from an opening in the frame base. The web adjuster can be used with a single web instead of two separate webs in certain embodiments.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A restraint sytem comprising:
   a web having a first end portion and a second end portion; and
   a web adjuster for adjusting tension in the web, the web adjuster including
      a frame having a pair of opposing sidewalls and a base extending therebetween, wherein the base includes a front portion having an upper surface and a lower surface, a rear portion, and an opening therebetween, wherein the web extends adjacent to the upper surface of the front portion, through the opening, and adjacent to the lower surface of the front portion such that the first end portion of the web extends in generally the same direction as the second end portion; and a cam member rotatably coupled between the opposing sidewalls and including a central axis and a cam surface portion having a plurality of engagement features, wherein the cam member is biased to rotate in a first rotational direction to drive individual engagement features toward the upper surface of the front portion of the base and against the web to restrict movement of the web from the upper surface through the opening in the base, wherein the plurality of engagement features extend away from the central axis and are angled in a second rotational direction, opposite to the first rotational direction, and wherein the cam member is rotatable in the second rotational direction to permit movement of the web from the lower surface through the opening in the base.

2. The restraint system of claim 1 wherein a first individual engagement feature is positioned at a first radial distance from the central axis, a second individual engagement feature is positioned at a second radial distance from the central axis, and a third individual engagement feature is positioned at a third radial distance from the central axis, and wherein the second radial distance is greater than the first radial distance, and the third radial distance is greater than the second radial distance.

3. The restraint system of claim 2 wherein the cam member includes a bore extending along the central axis, wherein the upper surface includes a horizontal surface portion and a ramped surface portion extending from the horizontal surface portion, wherein the base further includes a curved surface portion between the upper surface and the lower surface and forming an edge of the opening, wherein the web is positionable to extend along the horizontal surface portion, the ramped surface portion, and the curved surface portion, and wherein the web adjuster further comprises:

a biasing member positioned within the bore of the cam member to bias the cam member in the first rotational direction; and a handle operably coupled to the cam member, wherein the handle is operable to rotate the cam member in the second rotational direction to drive individual engagement features away from the base to permit movement of the web.

4. The restraint system of claim 3, further comprising a strap coupled to the handle and operable to rotate the cam member in the second rotational direction, and wherein one or more of the plurality of engagement features is positioned to contact the web to remove contaminants from the web when the web is moved.

5. The restraint system of claim 1, further comprising means for biasing the cam member in the first rotational direction.

6. The restraint system of claim 1 wherein the base further includes a curved surface portion forming an edge of the opening, and wherein the curved surface portion provides a smooth surface for movement of the web through the opening.

7. The restraint system of claim 1 wherein the cam surface portion is eccentrically oriented relative to the central axis.

8. A restraint system, comprising:
a web having a first end portion and a second end portion; and
a web adjuster for adjusting tension in the web, the web adjuster including:
a frame having a base portion, wherein the base portion includes a front portion, a rear portion, and an opening therebetween, wherein the web extends along an upper surface of the front portion, through the opening, and at least partially along a lower surface of the front portion such that the first end portion extends away from the web adjuster in generally the same direction as the second end portion;
a cam member rotatably coupled to the frame, wherein the cam member extends along a central axis and includes a first engagement feature positioned at a first radial distance from the central axis and a second engagement feature positioned at a second radial distance from the central axis, larger than the first radial distance, wherein the web extends between the cam member and the base portion, and wherein the cam member is rotatable to drive at least one of the first engagement feature and the second engagement feature toward the base portion to engage the web and restrict movement of the web through the opening in at least one direction.

9. The restraint system of claim 8 wherein the base portion includes a curved surface portion forming an edge of the opening, and wherein the curved surface portion reduces friction on the web during movement of the web through the opening.

10. The restraint system of claim 8 wherein the cam member includes a bore, and wherein the web adjuster further includes a biasing member positioned in the bore to bias the cam member rotate in a rotational direction that drives drive at least one of the first engagement feature and the second engagement feature toward the first horizontal surface to engage the web and restrict movement of the web.

11. The restraint system of claim 8 wherein the cam member is rotatable in a first rotatable direction to drive at least one of the first engagement feature and the second engagement feature toward the upper surface of the front portion of the base portion to engage the web and restrict movement of the web from the upper surface through the opening in the base portion, and wherein the first engagement feature and the second engagement feature are angled in a second rotational direction, opposite to the first rotational direction.

12. The restraint system of claim 8, further comprising a handle coupled to the cam member and a strap coupled to the handle, wherein the strap is operable to move the handle to rotate the cam member in a rotational direction to release a tension in the web.

13. The restraint system of claim 8 wherein rotation of the cam member moves the first engagement feature and the second engagement feature along a surface of the web to remove debris therefrom.

14. The restraint system of claim 8 wherein movement of the web between the upper surface of the front portion of the base portion and the cam member moves the web against the first engagement feature and the second engagement feature and removes debris from the web.

15. A restraint system comprising:
a web;
a frame having a first end portion, a second end portion, and an opening between the first end portion and the second end portion, wherein the first end portion includes an upper surface portion, a curved surface portion forming an edge of the opening, and a lower surface portion, and wherein the web extends along the upper surface portion, through the opening, and along the lower surface portion; and a cam member rotatably coupled to the frame, wherein the cam member extends along a central axis and includes a cam surface portion having a plurality of protrusions, wherein the cam surface portion is eccentrically oriented relative to the central axis, and wherein the cam member is rotatable to move an individual protrusion toward the horizontal surface portion to engage the web and restrict movement of the web.

16. The restraint system of claim 15 wherein the plurality of protrusions are shaped to clear debris from the web when there is relative motion between the web and the plurality of protrusions while the web and the plurality of protrusions are in contact.

17. The restraint system of claim 15 wherein the plurality of protrusions extend away from the central axis and are angled in a rotational direction.

18. The restraint system of claim 15, further comprising a handle coupled to the cam member, wherein the handle is operable to rotate the cam member to release a tension in the web.

19. The restraint system of claim 18, further comprising a strap operably coupled to the handle, wherein the strap is operable to rotate the cam member via the handle.

20. The restraint system of claim 15 wherein the cam member includes a bore extending along the central axis, wherein the web adjuster further comprises a shaft extending through the bore and a biasing member positioned within the bore and encircling the shaft, wherein the cam member is rotatably coupled to the frame via the shaft, and wherein the biasing member biases the cam member to rotate in a direction that moves the individual protrusion toward the horizontal surface portion to engage the web and restrict movement of the web.

* * * * *